United States Patent
Bourbonnais

(10) Patent No.: US 11,630,776 B2
(45) Date of Patent: Apr. 18, 2023

(54) METHODS AND SYSTEMS FOR FAST ALLOCATION OF FRAGMENTED CACHES

(71) Applicant: Oracle International Corporation, Redwood Shores, CA (US)

(72) Inventor: Roch Bourbonnais, Corenc (FR)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/827,209

(22) Filed: May 27, 2022

(65) Prior Publication Data

US 2022/0318143 A1 Oct. 6, 2022

Related U.S. Application Data

(63) Continuation of application No. 17/222,307, filed on Apr. 5, 2021, now Pat. No. 11,386,007.

(51) Int. Cl.

| G06F 12/08 | (2016.01) |
|---|---|
| G06F 12/084 | (2016.01) |
| G06F 9/50 | (2006.01) |
| G06F 12/02 | (2006.01) |
| G06F 12/0871 | (2016.01) |

(52) U.S. Cl.
CPC .......... G06F 12/084 (2013.01); G06F 9/5016 (2013.01); G06F 12/0238 (2013.01); G06F 12/0871 (2013.01)

(58) Field of Classification Search
CPC .. G06F 12/084; G06F 9/5016; G06F 12/0238; G06F 12/0871
See application file for complete search history.

(56) References Cited

U.S. PATENT DOCUMENTS

| 2005/0080874 A1* | 4/2005 | Fujiwara | ............. H04L 67/1097 709/217 |
|---|---|---|---|
| 2008/0205291 A1 | 8/2008 | Li et al. | |

(Continued)

OTHER PUBLICATIONS

"[Patch 06/10] SLUB: Free Slabs and Sort Partial Slab Lists in Kmem_Cache_Shrink", Available Online at :https://marc.info/?l=linux-mm&m=117764826429215&w=2, 2007, 3 pages.

(Continued)

*Primary Examiner* — Jae U Yu
(74) *Attorney, Agent, or Firm* — Kilpatrick Townsend & Stockton LLP

(57) ABSTRACT

Aspects of the present disclosure include methods and system for fast allocation of memory from fragmented memory. In one example, at a processor receives a request for an address to a buffer stored in a magazine associated with the processor. Upon determining that the magazine associated with the processor is empty, a request is made to a depot layer for additional memory. Upon determining that the depot layer cannot satisfy the request for the additional memory, executing a call to a slab layer for the additional memory. The slab layer identifies one or more partially-allocated slabs and generates a new magazine. A set of addresses correspond to buffers may be stored in the new magazine. A reference to the new magazine may be transferred from the slab layer to the depot layer. The reference to the new magazine may then be transferred from the depot layer to the processor.

20 Claims, 5 Drawing Sheets

(56) References Cited

U.S. PATENT DOCUMENTS

2009/0249134 A1  10/2009 RostamPisheh et al.
2020/0110639 A1   4/2020 Corsi et al.
2020/0319928 A1  10/2020 Schreter

OTHER PUBLICATIONS

Bonwick et al., "Magazines and Vmem: Extending the Slab Allocator to Many CPUs and Arbitrary Resources", USENIX, The Advanced Computing Systems Association, Feb. 2019, 19 pages.
International Application No. PCT/US2022/015009, International Search Report and Written Opinion, dated May 27, 2022, 13 pages.
U.S. Appl. No. 17/222,307, Notice of Allowance dated Mar. 9, 2022, 8 pages.
Bonwick, The Slab Allocator: An Object-Caching Kernel Memory Allocator, USENIX Summer 1994 Technical Conference, Available Online at: https://people.eecs.berkeley.edu/~kubitron/courses/cs194-24-S14/hand-outs/bonwick_slab.pdf, Jun. 6-10, 1994, 12 pages.

\* cited by examiner

METHODS AND SYSTEMS FOR FAST ALLOCATION OF FRAGMENTED CACHES

CROSS-REFERENCE TO RELATED APPLICATIONS

This application is a continuation of U.S. application Ser. No. 17/222,307, filed on Apr. 5, 2021, the entire contents of which are incorporated herein by reference for all purposes.

TECHNICAL FIELD

This disclosure generally relates to memory allocation. More specifically, but not by way of limitation, this disclosure relates to allocating fragmented cache memory.

BACKGROUND

Processors within computing devices may allocate different types of memory to execute threads. For example, a processor may allocate a portion of the cache memory for use in executing a thread. During execution the processor may store data in the cache memory that may be utilized by the thread. When the thread terminates, the processor may store the results within random access memory (RAM), non-volatile memory, and/or retain the results within the cache for use with subsequent threads. The processor may then free the cache memory allocated to the thread enabling the processor to allocate that region of cache memory for other threads.

The cache memory may be represented as a set of addresses that each correspond to a block of memory configured to store data. Processors may allocate memory in contiguous blocks of the cache memory. Some threads executed on processors may have varying executions and/or use varying amounts of memory. This may cause the memory to become fragmented in which the memory may be interspersed with blocks of free memory that are too small to be allocated by processors. When memory becomes fragmented, performance of the computing device may become impacted.

SUMMARY

Aspects of the present disclosure include a method for tracing memory components in asset management systems. The method comprises: receiving, at a processor, a request for a buffer from a magazine of the processor for allocation to one or more threads, wherein the magazine of the processor is configured to store a set of addresses, each address of the set of addresses corresponding to a location of a buffer in memory; detecting, in response to the receiving the request for the buffer, that the magazine of the processor is empty; requesting, in response to detecting that the magazine of the processor is empty, additional memory from a depot layer that includes a repository of references to magazines; determining that the depot layer cannot satisfy the request for the additional memory; executing, by the depot layer, a call to a slab layer, the call to slab layer including the request for the additional memory; identifying, by the slab layer, one or more partially-allocated slabs, each partially-allocated slab including a set of buffers, wherein each partially-allocated slab of the one or more partially-allocated slabs includes one or more free buffers that are available to be allocated to threads; generating a new magazine; storing, in the new magazine, addresses of the one or more free buffers of the one or more partially- allocated slabs; transferring from the slab layer to the depo layer a reference to the new magazine; and transferring from the depo layer to the processor, the reference to the new magazine.

Another aspect of the present disclosure includes a system comprising one or more processors and a non-transitory computer-readable media that includes instructions that, when executed by the one or more processors, cause the one or more processors to perform part or all of a method described herein.

Another aspect of the present disclosure includes a non-transitory computer-readable media that includes instructions that when executed by one or more processors, cause the one or more processors to perform part or all of one or more methods described herein.

These illustrative examples are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
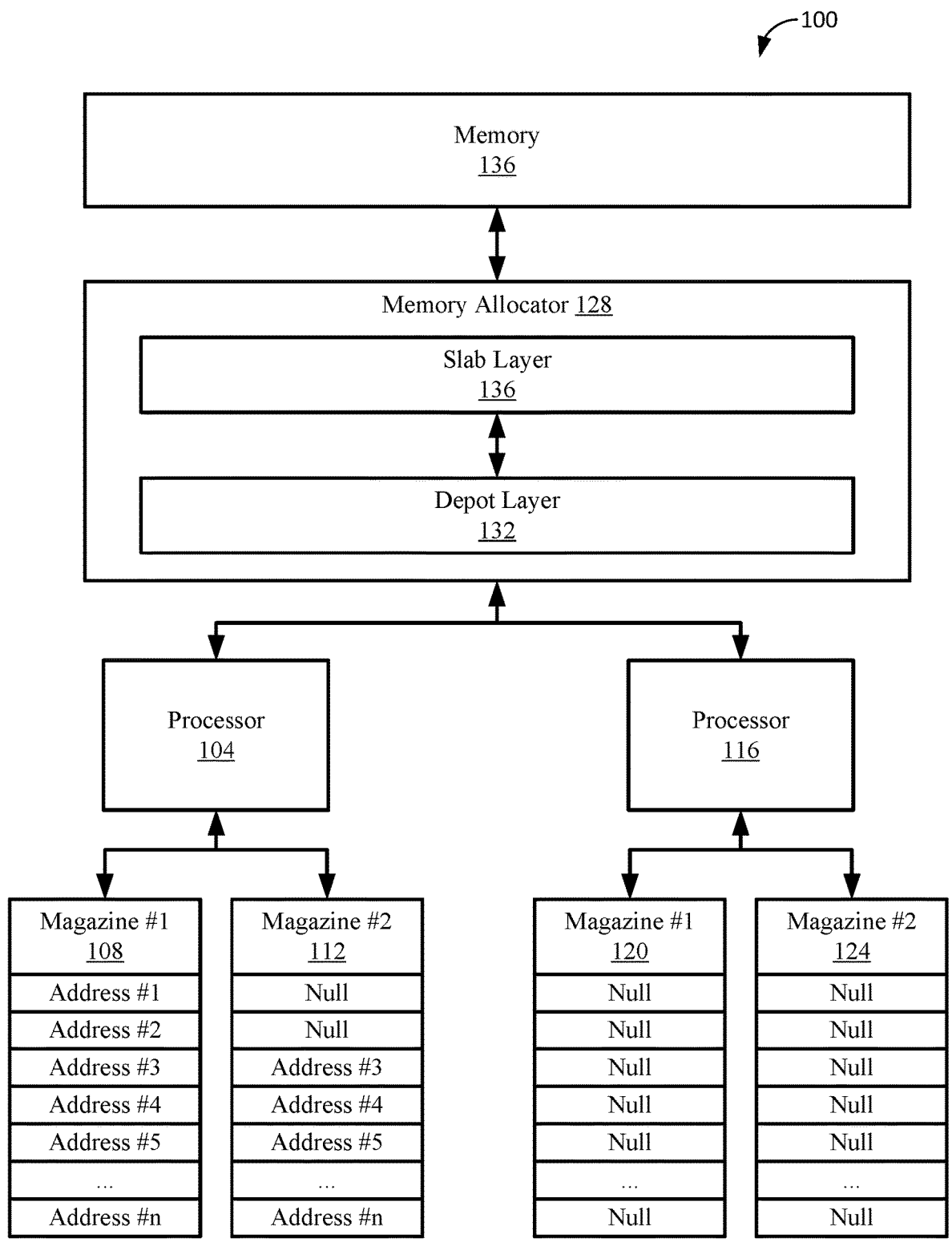
FIG. 1 depicts an example of a block diagram for allocating memory in a processing system according to some aspects of the present disclosure.

The present disclosure involves the fast allocation of memory blocks from fragmented memories that reduces processing delays associated with allocating memory from fragmented memories. Memory may be allocated using magazines (e.g., a data structure, or the like) that stores a predetermined set of references (e.g., a memory address, a buffer, etc.), to blocks of memory that are available for allocation to threads. Memory may be allocated to a thread by assigning the first reference to a block of memory in the set of references of the magazine to the requesting thread. The first reference may then be removed from the magazine (e.g., replaced with a null value, 0, or the like) to prevent allocating the block of memory referenced by the first reference to another thread before the thread has terminated. Memory may be allocated in this manner until a magazine is empty at which point a new magazine may be requested from a depot layer.

The depot layer may store references to full magazines (e.g., with a predetermined maximum quantity of references to free memory) that can be used to satisfy the request for the new magazine. The depot layer may be positioned between memory allocation layer (e.g., such as a processor, a processes executing on the processor, and/or the like) and a slab layer that includes slabs that represent physical memory that can be allocated by the memory allocation layer. The depot may be prepopulated with references to magazines that are available to be passed to the memory allocation layer when requested. Prepopulating the depot layer with references to full magazines, may increase the rate at which a reference to a new, full magazine can be passed to the memory allocation layer.

The depot layer may run out of references to magazines that can be passed to the memory allocation layer. In those instances, the depot layer may request a new magazine from the slab layer. The slab layer includes a set of slabs with each slab represent a contiguous quantity of blocks of memory. The slab layer may generate new magazines by filling the magazine with references to one or more blocks of memory from a slab of the slab layer. A reference to the new magazine may be passed to the depot layer, which may pass the reference to the new magazine to the memory allocation layer.

In some instances, the longer the system continues operations the more likely the slabs of the slab layer may become fragmented. Memory fragmentation may occur due to a process requesting memory (e.g., a set of buffers) from the memory allocation layer that is freed (e.g., returned) at different times. For example, a first process may request a contiguous set of buffers for threads of the process. Since the threads terminate at different times, the memory allocated to the threads may be freed (e.g., available for allocation to the other processes) at different times. After a first time, the process may free two of the five buffers. The two free buffers may be returned to a partial magazine in the magazine layer. If the other three buffers of the set of buffers are freed, the partial magazine may be a full magazine that can be used by a process to allocate memory. Over time (e.g., after a large number of memory requests and free operations), the magazine layer may accumulate a number of partially filled magazines. After some time, the system may reap the magazines (e.g., remove the magazines and return the buffers to the slab layer) to recover the memory. This may return memory to the slab layer that can be used to generate new magazines for the magazine layer. The two buffers of the set of buffers may be returned to the slab layer, the remaining buffers of the set of buffers may continue to be allocated to the process. The memory returned to the slab may not be contiguous causing the slab to become fragmented.

As slabs become partially-allocated (e.g., that include one or more blocks that are already allocated to threads or assigned to magazines), filling magazines in a particular order may prevent the efficient utilization of slabs (e.g., increasing a quantity of partially-allocated slabs, which may reduce the rate in which memory can be identified for filling subsequent magazines). The slab layer may increase utilization of partially-allocated slabs by attempting to fill new magazines with memory from partially-allocated slabs first. For example, when a request for a new magazine is received from the depot layer, the slab layer may first identify slabs that are partially-allocated. For example, the slab layer may include a slab index that stores an identification of each partially-allocated slab and an indication of an amount of free memory in each slab.

Since the slab layer may be fragmented (e.g., slabs including various amounts of free memory), filling magazines with partially-allocated slabs in order may maintain the quantity of partially-allocated slabs (e.g., underutilizing the partially-allocated slabs) or increase the quantity of partially-allocated slabs. The slab layer may defragment itself while filling magazines (e.g., in a same process) by sorting the slab index (e.g., generating sorted slab index) that represents partially-allocated slabs in an order of increasing amounts of free memory (e.g., the partially-allocated slab having the least amount of free memory may be represented first and the partially-allocated slab having the most amount of free memory may appear last).

The sorted index enables the slab layer to start filling a new magazine using the remaining free memory of the first partially-allocated slab in the sorted slab index (e.g., having the least amount of free memory). If all of the blocks of memory of a slab are allocated before the magazine is full, the slab layer may identify the next partially-allocated slab in the sorted slab index (e.g., the slab having the next least amount of free memory) and continue filling the magazine. Once the magazine is full a reference to the new magazine may be passed to the depot layer, which may pass the reference to the new magazine to the memory allocation layer.

By allocating memory from partially-allocated slabs using the sorted slab index, the system can improve utilization of partially-allocated slabs. As a result, the system may reduce the quantity of partially-allocated slabs (e.g., as partially allocated slabs become fully-allocated slabs), which may simplify the slab layer and increase the rate in which subsequent magazines can be filled.

FIG. 1 depicts an example of a block diagram for allocating memory in a processing system according to some aspects of the present disclosure. Processing system 100 may include processor (processor) 104 that executes threads of processing unit 100. Processor 104 may include a reference to one or more magazines (e.g., such as magazine 108 and magazine 112, as shown) that processor 104 may use to allocate memory to threads that processor 104 executes. Magazine 108 and magazine 112 may store reference to a region of memory that is available to be allocated to a thread. Processing system 100 may include additional processors such as processor 116 and other processors (not shown). Processor 116 (and other processors) may include references to magazines (e.g., such as magazine 120 and magazine 124). Each processor of processing system 100 may include a reference to any number of magazines. In some instances, each processor of processing system 100 may include a same quantity of references to magazines. In other instances, each processor may include a different quantity of references to magazines based on a processing load of that processor or the like.

The region of memory may be a page that corresponds to a fixed-length contiguous block of memory. Alternatively, the region of memory may be dynamically determined at runtime (e.g., based on the processes and/or threads executed by the processor). For example, if threads of a process require a lot of memory, the region of memory may be larger than a page. Those instances, each region of memory of referenced within a magazine may be of a predetermined factor (x) of a page based on the amount of memory needed by the threads. For example, the region of memory referenced within a magazine may be two pages in length, three pages in length, etc. based on the requirements of the threads. The region of memory referenced in a magazine may also be less than a page based on the requirements of the threads (e.g., some fraction, y, of a page). The reference to the region of memory may be an address to the region of memory (e.g., such as a first address of the region of memory or the like).

In some instances, the regions of memory referenced in a magazine may be of a uniform size. For example, each address of magazine 108 may reference a region of memory that is of a same size. When executing a thread, processor 104 may obtain the first available reference to a region of memory in a magazine. The reference (e.g., the address) may be used to allocate the region of memory that corresponds to the reference to the thread. Once allocated, the reference to the region of memory may be removed from the magazine (e.g., to prevent the allocation of a same region of memory to different threads). Processor 104 may obtain references from a first magazine before obtaining references in other magazines available to processor 104.

For instance, as shown in FIG. 1, processor 104 may obtain references to regions of memory from magazine 112 (e.g., resulting in magazine 112 removing references to regions of memory that have already been allocated to threads by processor 104). When all of the references in magazine 112 have been removed (e.g., magazine 112 is empty), processor 108 may obtain references from magazine 108. Processor 104 may also request a new magazine from memory allocator 128 before the references in magazine 108 are removed to prevent processor 104 from being without memory to allocate to threads (e.g., stalling execution of processes by processor 104). Alternatively, processor 104 may obtain references from any available magazine. For example, processor 104 may alternate obtaining references from magazine 108 and magazine 112. In another example, processor 104 may obtain references from the magazine having a greater quantity of available references.

When a region of memory is freed, the reference to the region of memory may be returned to a magazine. In some instances, the reference to the region of memory may be added to the magazine currently in use by processor 104 (e.g., magazine 108 or magazine 112). In other instances, the reference to the region of memory may be added to empty or partially-filled magazine in the magazine layer (e.g., such as the magazine from which the reference to the region of memory originated, or a first partially-filled magazine, etc.). In still yet other instances, the reference to the region of memory may be returned to the slab layer (e.g., which may use the reference to the region of memory of filling a new magazine).

Magazines may be a data structure that is similar to a stack or queue in which the references may be accessed a predetermined sequence. In some instances, magazines may use a last-in-first-out (LIFO) sequence. The magazine may store an index value that corresponds to the first (non-null) reference in the magazine (e.g., Address #3) of magazine 112, which represents the last reference to be added to magazine 112. Processor 104 may use the index value to obtain the first available reference to a region of memory from magazine 112 (e.g., Address #3) and allocate the region of memory at Address #3 to a thread. Address #3 may then be removed from magazine 112 to prevent Address #3 from being allocated to another thread. Removing Address #3 may include replacing Address #3 with another value (e.g., null, zero, etc.) or simply deleting the reference to the region of memory. The index value may then be decremented by one to refer to the new, first (non-null) reference in the magazine (e.g., Address #4). When a region of memory is freed (e.g., such as Address #3 or any other similar addresses), then the reference to that region of memory may be added to the magazine before the new, first reference in the magazine (e.g., before Address #3). The index value may be incremented by one to refer to the new, last reference in the magazine, Address #3. If the index value is at zero (e.g., indicating there are no available spaces to store a new reference in the magazine, the freed reference may be added to a magazine in the depot layer. In other instances, the magazine may be represented and/or function differently such as, but not limited to, a linked list, a first-in-first-out (FIFO) data structure, or the like.

When a magazine is empty (e.g., all references to available memory having been removed), a new magazine may be requested (e.g., by processor, etc.) or automatically supplied by memory allocator 128. Memory allocator 128 may a depot layer 132 and a slab layer 136 that manage the allocation of memory 136. The depot layer may include a repository of references to full magazines that can replace the empty magazine. For instance, processor 116 may detect that magazine 120 is empty and request a new magazine from memory allocator 128. Memory allocator obtains a reference to a full magazine form the depot layer 132 and passes the reference to processor 116. The new magazine may replace magazine 120 (e.g., the new magazine may become magazine 120). Memory allocator 128 may prepopulate depot layer with a repository of references to full magazines to reduce the time needed to replace empty magazines used by processors of processing system 100. When a reference to a magazine is passed to a processor, it may be removed from the repository to prevent the reference to that magazine from being passed to another processor.

In some instances, the repository of references in depot layer 132 may be depleted. As a result, upon receiving a request for a reference to a magazine, depot layer 132 may be unable to satisfy the request. Depot layer 132 may request a new magazine from slab layer 136. The request may include an indication of a memory size (e.g., that corresponds to a page, smaller than a page, or larger than a page). Slab layer 136 includes a set of slabs with each slab representing a set of regions of memory. For example, each slab may represent a set of pages of memory 136. Slab layer 136 may be configured to generate full magazines by generating an empty magazine (e.g., or obtaining a reference to an empty magazine from depot layer 132, etc.) and filling the magazine by storing references to regions of memory that correspond to the requested memory size.

Slab layer 136 may include, for each slab, a memory index that enables slab layer to quickly fill new magazines. The memory index may store an indication as to whether each region of memory of the set of regions of memory of a slab is allocated or free. Slab layer 136 may use the index of each slab to identify a slab that can be used to fill a magazine (e.g., includes a contiguous subset of the set of regions of memory that is free). The memory index may enable slab layer 136 to identify a contiguous subset of the set of regions of memory without the slab layer 136 having to individually analyze each slab each time a new magazine is requested.

Slab layer 136 may modify the memory index to enable slab layer 136 to fill magazines with a non-contiguous subset of the set of regions of memory from the slab. In some examples, slab layer 136 may sort the memory index according an indication that a region of memory of the set of regions of memory is free. This may organize the memory index such that regions of memory that are free are represented before regions of memory that are already allocated. Slab layer 136 may then fill the new magazine with the first regions of memory identified by the sorted memory index. The sorted memory index enable slab layer 136 to fully utilize partially-allocated slabs by filling magazines with the free regions of memory that are interspersed in the set of regions of memory of the slab. In some instances, slab layer 136 may fill the new magazine using a single slab. In other instances, slab layer 136 may fill the new magazine with the references to the regions of memory that are available in one slab (e.g., causing the partially-allocated slab to become a allocated slab) and fill any remaining references to regions of memory from another partially-allocated slab (if available) or an unallocated slab (e.g., if a partially-allocated slab is not found).

In other examples, rather than sort the memory index, slab layer 136 may periodically defragment fragmented slabs. Defragmenting a fragmented slab may include iterating over the set of regions of memory of the slab and copying the contents of allocated memory to an earliest free region of memory such that the allocated regions of memory become contiguous and positioned before any free regions of memory of the slab. Alternatively, defragmenting a fragmented slab may include iterating over the set of regions of memory of the slab and copying the contents of allocated memory to a latest free region of memory such that the allocated regions of memory become contiguous and positioned after any free regions of memory of the slab.

Slab layer 136 may then update references from the original allocated region of memory to the newly allocated region of memory to prevent memory reads/writes to be implemented in the newly allocated region of memory. In some instances, slab layer 136 may pass an indication of the reference update to the processor that allocated the original region of memory. The processor may then update references made by the thread to the original region of memory to refer to the newly allocated region of memory. In other instances, slab layer 136 may store an indication of the change in references to regions of memory in the memory index of the slab (or in another data structure). When a thread attempts to access the original allocated region of memory, slab layer 136 may intercept the access attempt and redirect it to the newly allocated region of memory.

In some instances, the slab layer itself may become fragmented when the slabs of the slab layers include a quantity of partially-allocated slabs with varying amounts of free memory. Slab layer 136 increase utilization of slabs by prioritizing partially-allocated slabs when filling new magazines. For example, slab layer 136 include a slab index that identifies each partially-allocated slab with an indication as to an amount of free memory in the slab. Slab layer 136 may modify the slab index to enable dynamic filling of magazines by sorting the slab index to generate a sorted slab index. The sorted slab index may represent partially-allocated slabs in an order of increasing amounts of free memory (e.g., the partially-allocated slab having the least amount of free memory may be represented first and the partially-allocated slab having the most amount of free memory may appear last). Slab layer 136 may attempt to fill new magazines using the free memory of the first slab in the sorted slab index (e.g., the slab having the least amount of free memory). If the slab includes enough free memory to fill the new magazine, a reference to new magazine is passed to depot layer 132. If the first slab does not have enough free memory to fill the new magazine, then the first slab may be used to fill as much of the new magazine as possible. This causes the first slab to become fully-allocated and to be removed from sorted slab index. The process may continue by attempting to fill the remaining portions of the new magazine using free memory of the next slab of the sorted slab index and so on until the new magazine is filled with references to regions of memory.

Slab layer 136, using the sorted slab index may defragment itself by causing partially-allocated slabs to become fully-allocated and removed from the slab index. This may reduce the quantity of partially-allocated slabs, simplify slab layer 136, and increase a rate in which a quantity of memory may be identified to fill subsequent magazines.

Once the new magazine is filled, slab layer 136 may pass a reference to the new magazine to the depot layer 132. If the new magazine was generated in response to a request from a processor, depot layer 132 may pass the reference to the new magazine to the requesting processor. If the new magazine was not generated in response to a request from a processor, then depot layer 132 may add the reference to the new magazine to the repository of references to full magazines for satisfying future requests by processor 104, processor 116, and/or other processors (not shown) of processing system 100.

Figure 2:
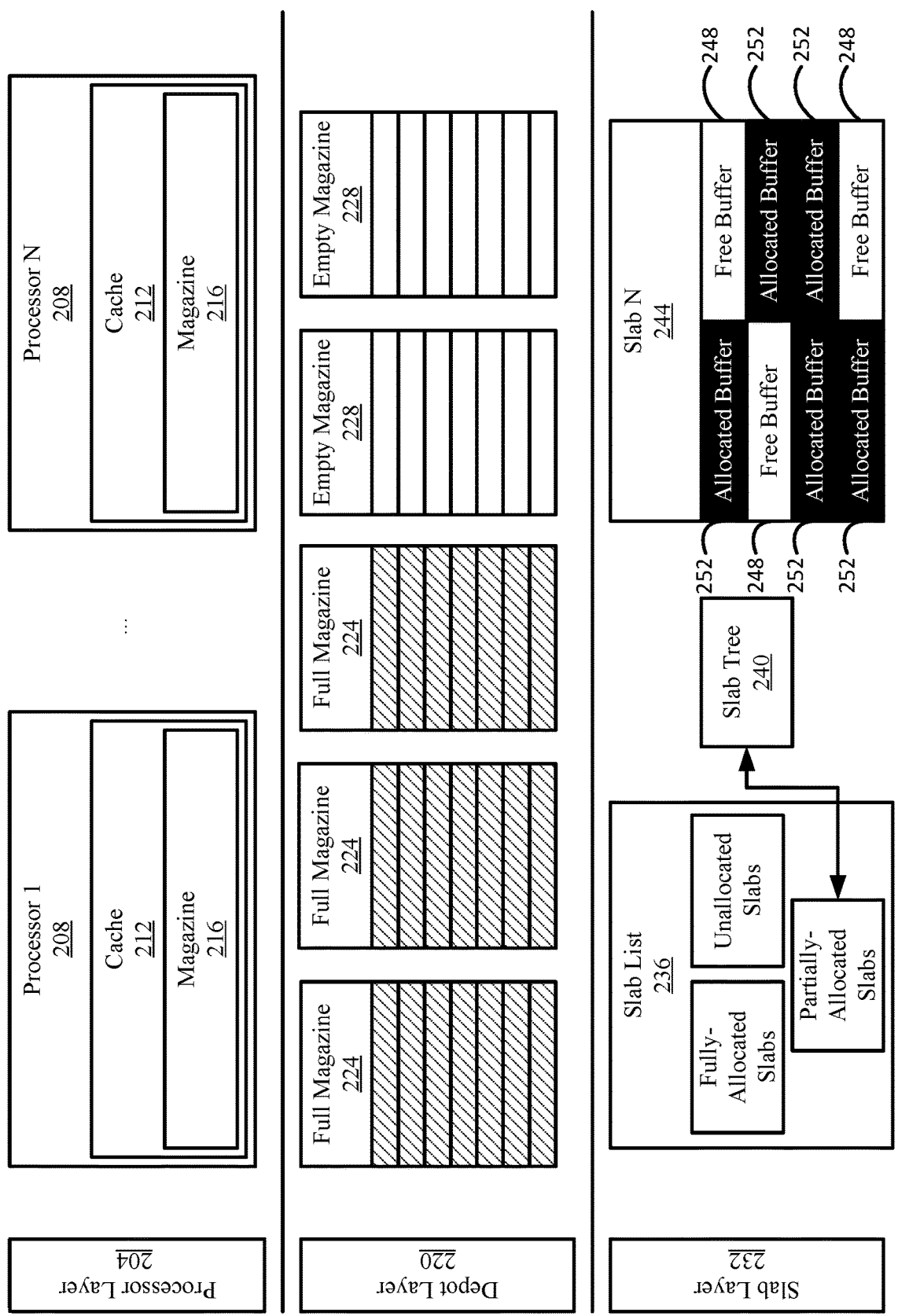
FIG. 2 depicts an example of a block diagram illustrating memory allocation layers of a processing system according to some aspects of the present disclosure.

FIG. 2 depicts an example of a block diagram illustrating memory allocation layers of a processing system according to some aspects of the present disclosure. The processing system (e.g., processing system 100 of FIG. 1) includes processor layer 204 that includes one or more processors 208 configured to execute threads. Each thread may be a discrete sequence of executable instructions. A process may be made up of a predetermined sequence of threads. One or more blocks of memory may be allocated to each block for the executable instructions of the thread (e.g., storing intermediate results of executable instructions, variables or contents therein, addresses or other references to data structures, final results of executing the instructions of the thread, and/or the like). In some instances, upon execution, a thread may request a particular quantity of blocks of memory for execution of the executable instructions of the thread. In other instances, another operation may execute to request (or cause) the allocation of a particular quantity of blocks of memory for execution of the executable instructions of the thread.

Processors 208 may include cache 212 for execution of threads by processors 208. Cache 212 may be used for the temporary storage of data during execution of threads by processors 208. Cache 212 may include physical and/or virtual memories. For example, central processing units (CPUs) may include a hierarchy of physical caches (e.g., L1, L2, L3, and L4) located proximate to the processor (e.g., for fast access to the physical memory) and may use other physical memories (e.g., such as random access memory, hard disk drives, magnetic storage, solid state drives, etc.) as extended cache memory (e.g., referred to as virtual cache memory or virtual memory). Cache 216 may store a reference to magazine 216. For example, the reference may be an address a region of cache 216 (or another memory) that stores a data structure that represents magazine 216. By using references (e.g., addresses), access to magazine 216 may be passed to different portions of the processing system without having to move the data structure representing magazine 216 in memory (or to different memories). In some instances, cache 212 may include multiple magazines 216.

Magazine 216 may store a set of references to free blocks of memory. For example, the reference may be an address to a block of memory, and address to a region of memory (e.g., a first address of two or more blocks of memory), an address of a buffer, or the like. Processor 208 may obtain a first reference to a free block of memory from the magazine and cause the free block of memory corresponding to the first reference to be allocated to a thread executing on processor 208. This may cause the first reference to the free block of memory to be removed from the magazine to prevent allocating the same block of memory to two different threads.

If magazine 208 is empty (e.g., does not include a reference to a free block of memory), processor 208 may generate a request to depot layer 220 for a full magazine. Depot layer stores a repository of references to magazines. In some instances, the repository may include references to full magazines. In other instances, the repository may include references to empty magazines (e.g., a reference to an empty magazine data structure can be filled) in addition to references to full magazines. For example, depot layer may include a reference to each of full magazines 224 and optionally a reference to each if empty magazines 228. In instances in which depot layer 220 stores empty magazines, when processor 208 requests a full magazine, processor 208 may include a reference to the now empty magazine 216. Depot layer may store the reference to empty magazine (e.g., as empty magazine 228) and pass a reference to full magazine 224 to processor 208 causing the reference to full magazine 224 to become magazine 216.

Slab layer 232 may include one or more slabs that each represent a region of physical or virtual memory (e.g., a contiguous blocks of memory). Slab layer may include slab index 236 that stores an identification of fully allocated slabs (e.g., the entire region of memory is allocated to threads), an identification of partially-allocated slabs (e.g., each including at least one block of free memory), and an identification unallocated slabs (e.g., the region of memory of each unallocated slab being free). For example, slab N 244 may be a partially-allocated slab (of multiple slabs of slab layer 232) that includes a set of buffers (e.g., a region of physical or virtual memory configured for temporarily storing data) that can be allocated to thread. Slab N 244 may include free buffers 248 (e.g., buffers that are available for allocation to threads) and allocated buffers 252 that are already allocated to threads. As shown slab N 244 may be fragmented (e.g., interspersed with free buffers with none of the free buffers being contiguous).

Slab layer 232 may represent the partially-allocated slabs using slab tree 240. Slab tree 240 may be any data structure configured to represent partially-allocated slabs according to an amount of free memory in the partially-allocated slab. For example, slab tree 240 may be a tree data structure (e.g., such as a binary search tree, a self-organizing binary search tree, and/or the like) that may store the identification of each partially-allocated slab in an order based on an amount of available free memory in the region of memory of the slab. As memory is allocated from a slab (e.g., the amount of free memory of the slab decreases) or memory is freed (e.g., memory block transitions from allocated to free), the position of the identified partially-allocated slab may be moved within the tree to reflect the new quantity of available free memory relative to other partially-allocated slabs referenced by the tree. If a partially-allocated slab becomes fully-allocated or unallocated, the identification of that slab may be removed from slab tree 240. Slab tree 240 may represent partially-allocated slabs in other types of data structures such as a list, a linked list, and/or any other data structure.

The slabs of slab layer 232 may represent the memory of cache 212 and/or other memories (e.g., virtual memory and/or other physical memory). The repository of references to magazines may be stored in cache 212 or in other memories of the processing system. In some instances, instructions for performing the operations described in connection to depot layer 220 and slab layer 232 may be stored in cache 212. In those instances, processor 208 and/or a different processor (not shown) of the processing system may access cache 212 to perform the operations described in connection to depot layer 220 and slab layer 232 may be stored in cache 212. In other instances, processing system may include a separate memory from cache 212 for storing instructions for performing the operations described in connection depot layer 220 and slab layer 232. In those instances, processor 208 and/or a different processor (not shown) of the processing system may access the separate memory to perform the operations described in connection to depot layer 220 and slab layer 232 may be stored in cache 212.

Figure 3:
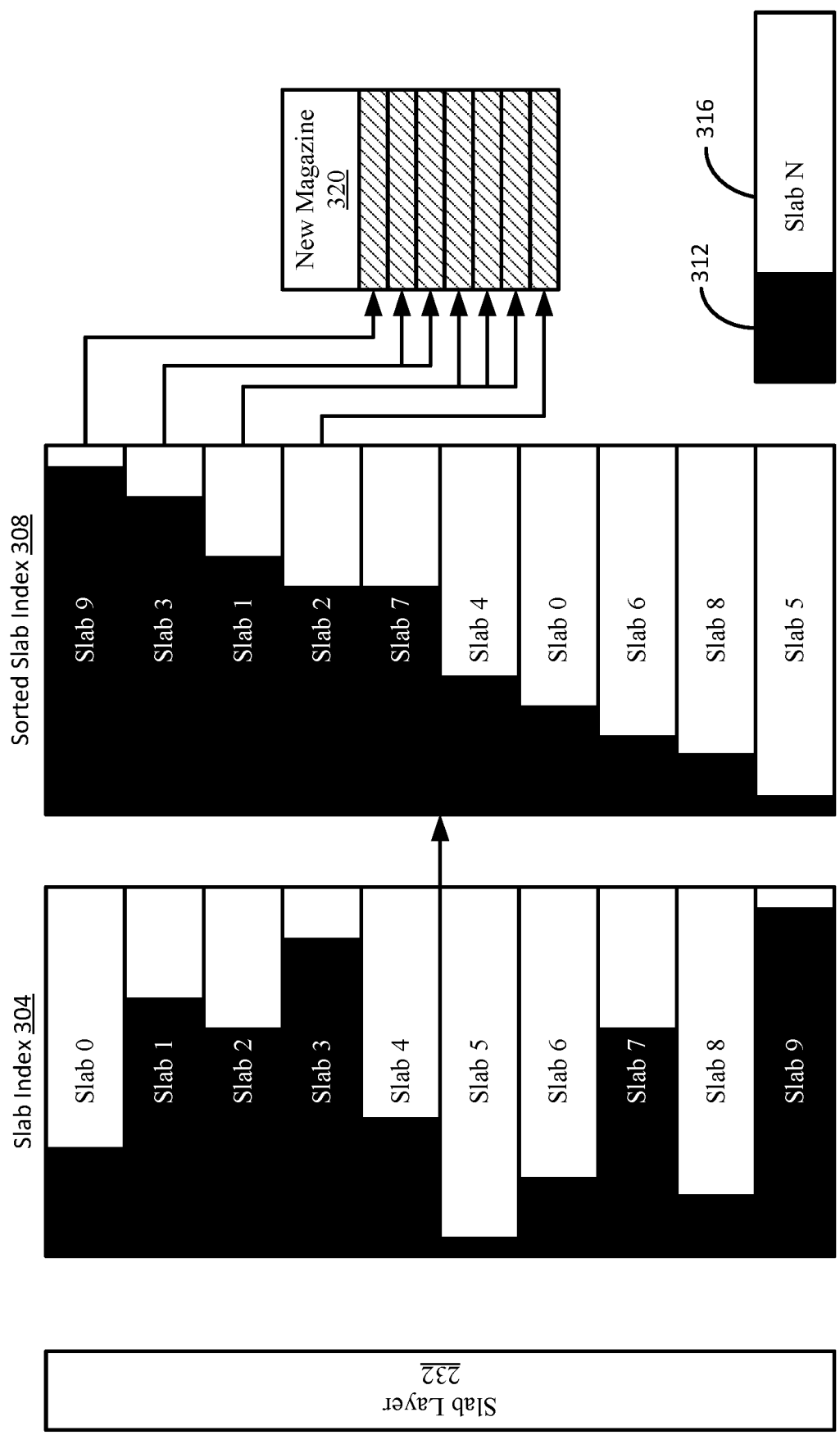
FIG. 3 depicts an example block diagram of a slab layer of cache memory according to some aspects of the present disclosure.

FIG. 3 depicts an example block diagram of a slab layer of cache memory according to some aspects of the present disclosure. In some instances, slab layer 232 may itself become fragmented. For example, slab layer 232 may fill magazines using memory from slabs in a particular order (e.g., from a first slab to a last slab). When a slab is fully allocated (e.g., does not include any free memory to fill magazines), slab layer 232 may begin filling magazines using memory of the next slab. Since allocated memory may be freed at different times, each partially-allocated slab of slab layer 232 may include various quantities of free memory available to be allocated at any given time. This may also occur when magazines are filled with a set of references to regions of memory in which each region of memory is less than a page in size.

Slab layer 232 may prioritize filling magazines using memory from partially-allocated slabs before using unallocated slabs. If slabs fills magazines in order (e.g., starting with slab 0), slab layer 232 may increase the fragmentation of slab layer 232. For example, slab index 304 may represent partially-allocated slabs of slab layer 232 with an indication of an amount of free memory in the slab. Each partially-allocated slab may be represented by a filled-in portion 312 representing an amount memory of the slab that is allocated (or already assigned to a magazine) and a non-filled-in portion 316 representing an amount memory of the slab that is free (e.g., and not assigned to a magazine). Slab layer may use slab index 304 to identify one or more slabs that have free blocks of memory that can be used to fill new magazine 320. For example, new magazine 320 may be filled by starting with a first slab (e.g., slab 0). In the example of FIG. 3, the first slab (e.g. Slab 0) of slab layer 232 may have more memory than is needed to fill new magazine 320. This may cause the first slab to remain partially-allocated.

Slab layer 232 may modify slab index 304 to enable dynamic filling of magazines that may reduce fragmentation in slab layer 232. For example, slab layer 232 may sort slab index 304 to generate sorted slab index 308. Sorted slab index 308 may represent partially-allocated slabs in an order of increasing amounts of free memory (e.g., the partially-allocated slab having the least amount of free memory may be represented first and the partially-allocated slab having the most amount of free memory may appear last). Slab layer 232 may attempt to fill new magazine 320 using the free memory of the first slab in sorted slab index 308 (e.g., slab 9). If the slab includes enough free memory to fill new magazine 320, a reference to new magazine 320 is passed to the depot layer, the processor layer, or the layer that requested the new magazine. If the first slab does not have enough free memory to fill new magazine 320, the remaining portion of the first slab in sorted slab index 308 may be used to fill as much of new magazine 320 as possible (e.g., in the example of FIG. 3, slab 9 provides a single reference to a region of member of slab 9). This causes the first block to become a fully-allocated slab and to be removed from slab index 304 and sorted slab index 308.

The process may continue by attempting to fill the remaining portions of new magazine 320 using the free memory of the next slab of sorted slab index 308 (e.g., slab 3) and so on until new magazine 320 is filled with references to regions of memory. By using sorted slab index 308, slab layer 232 may defragment itself by causing partially-allocated slabs to become fully-allocated and removed from slab index 304 and/or sorted slab index 308. In the example of FIG. 3, slab 9, slab 3, and slab 1, may become fully-allocated slabs and removed from slab index 304 and/or sorted slab index 308. This may reduce the quantity of partially-allocated slabs, simplify the slab layer, and increase a rate in which a quantity of memory may be identified to fill subsequent magazines.

Figure 4:
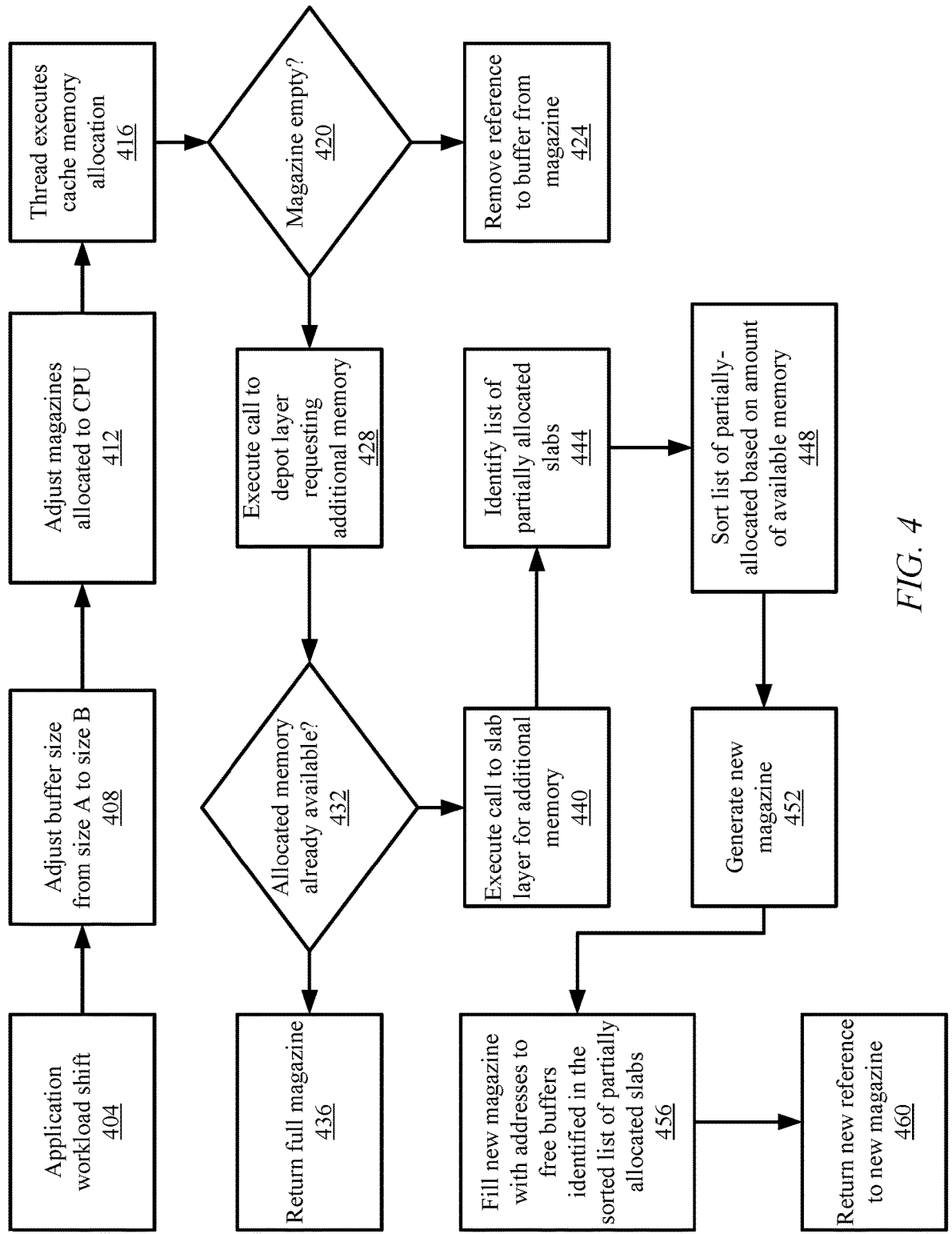
FIG. 4 depicts an example of a process for allocating new magazines according to some aspects of the present disclosure.

FIG. 4 depicts an example of a process for allocating new magazines according to some aspects of the present disclosure. At block 404, the process may begin by a processing system detecting an application workload shift. The application workload shift may correspond to a change in a processing load (e.g., of threads executed by the processing system). For instance, threads of the new application workload may use more or less memory than threads executing under the previous application workload.

At block 408, the process continues by adjusting a buffer size from a first size (e.g., A) to a second size (e.g., B) based on the change in application workload. If the change in the application workload results in threads using additional memory, then the buffer size may be increased by a predetermined quantity of memory. If the change in the application workload results in threads using additional memory, then the buffer size may be decreased by a predetermined quantity of memory.

At block 412, the process continues by adjusting magazines allocated to a central processing unit (CPU). Each CPU of the processing system may include one or more magazines, which may be used to allocate memory to threads executing on the CPU. Each magazine may include a set of references (e.g., addresses) to buffers that can be allocated to threads. Since the buffer size was adjusted based on the application workload shift, the references to the buffers in the magazine may also need to be adjusted. In some instances, adjusting the references to the buffers in the magazine may include removing the set of references to the buffers from the magazine and requesting, from a depot layer, a new magazine. The request may include a reference to the now empty magazine. The depot layer may use the reference to the empty magazine to fill the magazine with a new set of references to buffers that are of the second size. The depot layer may then return the reference to the now full magazine to the CPU.

In other instances, the CPU may discard the magazine and request a new magazine from the depot layer. In response, the depot layer may pass a reference to a new magazine that includes set of references to buffers that are of the second size. In still yet other instances, the CPU may request that the buffers referenced in the magazine be updated to the second size. In this instance, the reference to the buffers may not change even though the buffers themselves may be adjusted. As a result, the magazine may not be modified or adjusted, yet still reference buffers of the new size.

At block 416, a thread executes a cache memory allocation (e.g., a request for allocation of a buffer).

At block 420, the CPU determines if there is a reference to a buffer in the magazine. If there is at least one reference to a buffer in the magazine, then the process continues to block 424.

At block 424, the CPU may remove the at least one reference to the buffer in the magazine. The CPU may use the reference to the buffer to allocate the buffer to the thread, which may enable the thread to read and/or write data to the buffer. In some instances, the process may return to block 416 and wait for the thread (or another thread) to execute a cache memory allocation. Alternatively, the process may return to block 420 to determine if the magazine is now empty as a result of removing the reference to the buffer from the magazine.

If, at block 420, the processor determines that there are no references to buffers left in the magazine (e.g., the magazine is empty), then the process continues at block 428.

At block 428, the CPU executes a call to the depot layer (e.g., such as depot layer 132 and/or 220) requesting additional memory. The call may include a reference to the empty magazine of the CPU. In some instances, the call may also include an indication of a requested buffer size (e.g., the second size) of buffers that are to be referenced by the magazine.

At block 432, the depot layer determine whether there are references to full magazines. For example, the depot layer may include a repository of references to full magazines. In some instances, some magazines may include references to buffers that are of a different size that buffers references by other magazines. If the call to the depot layer includes the requested buffer size, the depot layer may determine if there is a reference to a magazine that includes references to buffers that are of the requested buffer size. If the call does not include the requested buffer size, then the depot layer may determine there is any reference to a full magazine. If the depot layer identifies a reference to a full magazine that may satisfy the call from the CPU, then the process continues to block 436.

At block 436, the identified reference to the full magazine may be passed to the CPU. Alternatively, if the call to the depot layer included a reference to the CPU's empty magazine, the depot layer may fill the empty magazine using a set of references to buffers found in the identified reference to the full magazine. The CPU may use the reference to the full magazine to allocate buffers to threads. In some instances, the process may return to block 416 and wait for the thread (or another thread) to execute a cache memory allocation.

Returning to block 432, if the depot layer is unable to identify a reference to a full magazine that can satisfy the request by the CPU, then the process continues to block 440.

At block 440, the depot may execute a call to the slab layer for a new magazine (e.g., additional memory). The call from the depot layer to the slab layer may include details included in the call from the CPU to the depot layer. For instance, the call from the depot layer to the slab layer may include a reference to the empty magazine (of the CPU) and/or an indication of a requested buffer size.

The slab layer may include one or more slabs of memory. Each slab may include a set of buffers that may be allocated for execution of threads by the CPU. In some instances, slabs may include buffers of various sizes. In those instances, filling a new magazine may include identifying a slab that includes buffers that correspond to a requested buffer size and filling the new magazine with references to buffers from the identified slab. In other instances, the slab layer may dynamically adjust buffer sizes of the slab. For example, if the call from the depot layer includes a requested buffer size that is larger or smaller than the current buffer size of the slab layer, the slab layer may adjust the buffer size of at least one slab to enabling filling magazine with reference to buffers that correspond to the requested buffer size.

At block 444, the process continues by identifying a list of partially-allocated slabs (e.g., such as slab index 304 or sorted slab index 308). The list may include an identification of slabs in which at least one buffer of the slab is already allocated or included in magazine (e.g., cannot be allocated).

At block 448, the process continues by sorting the list of partially-allocated slabs based on an amount of free memory in each slab. In some instances, the list may be sorted such that partially-allocated slabs may be represented in an order of increasing amounts of free memory (e.g., the partially-allocated slab having the least amount of free memory may be represented first and the partially-allocated slab having the most amount of free memory may appear last). In other instances, the list may be sorted such that partially-allocated slabs may be represented in an order of decreasing amounts of free memory. In still yet other instances, the list may be sorted according any parameter of the partially-allocated slabs.

In some examples, the list may already be sorted (e.g., in a previous iteration of the process of FIG. 4, in a previous block of the process of FIG. 4, or the like). In those examples, after performing block 444, the process may skip block 448 and continue to block 452.

At block 452, the process continues by generating a new magazine. Generating a new magazine may include storing an empty magazine data structure in memory. If the call to the slab layer included the reference to the empty magazine of the CPU, then a new magazine may not be generated. Instead, the reference to the empty magazine of the CPU may be referred to as the new magazine. The slab layer may then fill the empty magazine (e.g., as further described in block 456).

At block 456, the new magazine may be filled with references to buffers in the first partially-allocated slab in the sorted list. If the first partially-allocated slab does not include enough memory to fill the new magazine, then the new magazine may be filled with reference to the remaining free buffers of the first partially-allocated slab. This may cause the first partially-allocated slab to become fully-allocated and removed from the list. The remaining portion of the magazine may be filled using the next partially-allocated slab. This process may continue until the new magazine is full.

At block 460, the slab layer may return the reference to the new (full) magazine to the depot layer. The depot layer may receive the reference to the new magazine and pass the reference to the CPU that requested the new magazine. CPU may use the reference to the magazine to continue execution threads.

Figure 5:
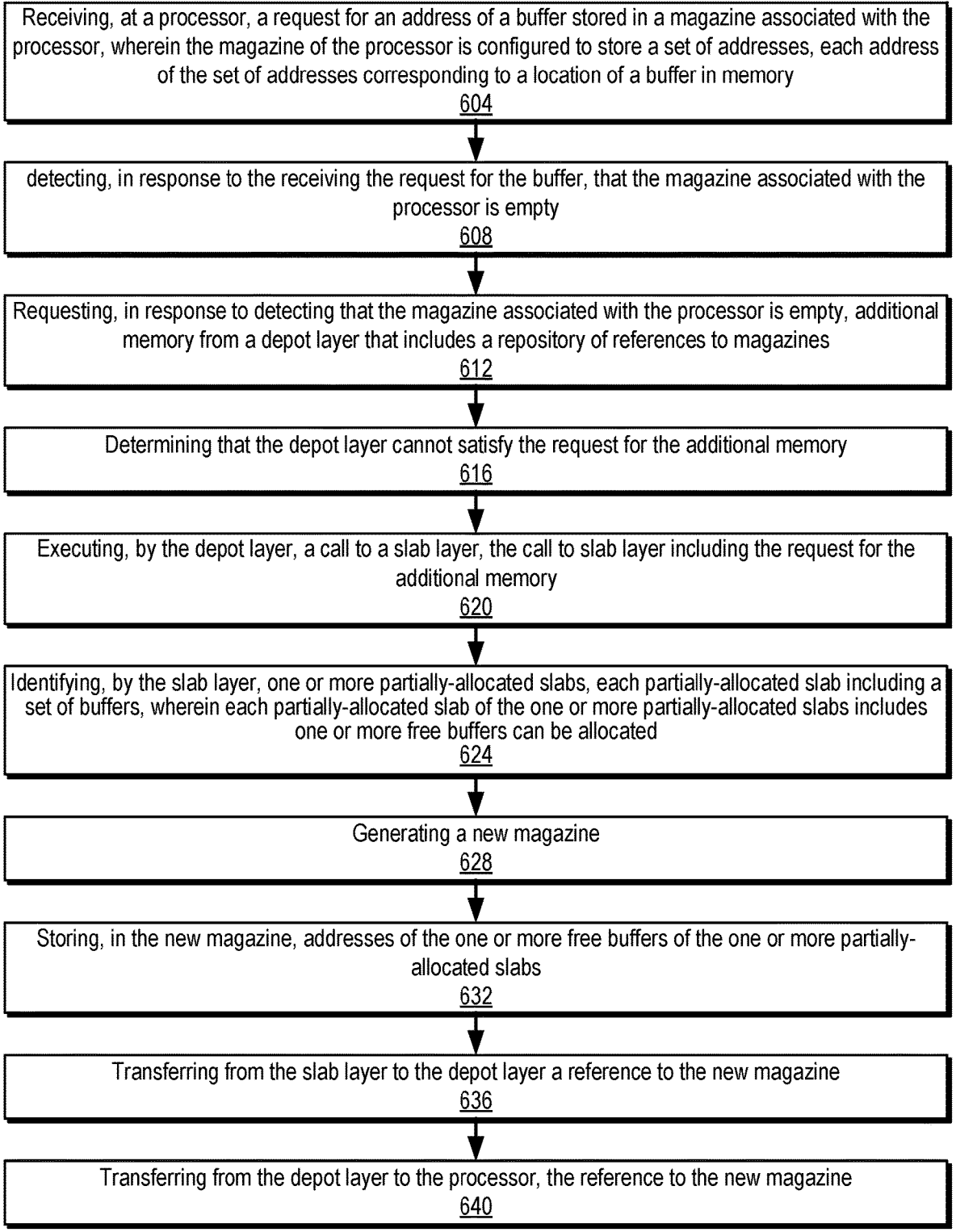
FIG. 5 depicts an example flowchart of a process for allocating cache memory for execution of a thread according to some aspects of the present disclose.

FIG. 5 depicts an example flowchart of a process for allocating cache memory for execution of a thread according to some aspects of the present disclose. At block 504, a processor may receive a request for a reference to a buffer stored in a magazine associated with the processor. The magazine associated with the processor may store a set of references (e.g., addresses) to a region of memory (e.g., a buffer). Each reference may be used to allocate the corresponding region of memory to a thread (or the like) executing on the processor. The region of memory may correspond to physical memory (e.g., such cache memory, random access memory, a hard disk drive, or the like) or virtual memory.

At block 508, the processor may detect, in response to the receiving the request for the buffer, that the magazine associated with the processor is empty (e.g., does not include any references to a buffers).

At block 512, the processor may request, in response to detecting that the magazine associated with the processor is empty, additional memory from a depot layer. The depot layer may include a repository of references to full magazines. Upon receiving the request from the processor, the depot layer may determine if there is a reference to a full magazine in the repository of references to magazines. If such a magazine exists in the repository, the depot layer may return a reference to the identified magazine to the processor. The process of FIG. 5 may then return to block 404 and wait for another thread or process requests a buffer.

In some instances, the processor may include one or more parameters for selecting a reference to a magazine. For example, the one or more parameters may include, but are not limited to, a buffer size (e.g., each reference may correspond to a buffer that is of a size that is equal to or approximately equal to the buffer size), a quantity of references included in the full magazine. (e.g., the magazine size may be dependent on the buffer size). The one or more parameters may be used by the depot layer to select a reference to a particular magazine from references to other magazines.

At block 516, it is determined that the depot layer cannot satisfy the request for the additional memory. For instance, it may be determined that the repository of references to magazines is empty or does not include a reference to a magazine that requested by the processor.

At block 520, the depot layer executes a call to a slab layer for the additional memory. The request may include the one or more conditions provided by the CPU (e.g., buffer size, etc.).

At block 524, the slab layer may identify one or more partially-allocated slabs. A partially-allocated slab may include a set of buffers. A partially-allocated slab may include at least one buffer that is allocated to a thread or assigned to a magazine and one or buffers that can be allocated.

At block 528, a new magazine may be generated. The new magazine may be empty (e.g., not include any references to buffers). In some instances, the processor may include, in the call to the depot layer, a reference to the empty magazine of the CPU. The depot layer may also include the reference to the empty magazine of the CPU in the call to the slab layer. In those instances, rather than generating a new magazine, the slab layer may use the reference to the empty magazine instead.

At block 532, a set of addresses is stored in the new magazine (or the empty magazine of the CPU). Each address of the set of addresses may correspond to a buffer of a partially-allocated slab of the one or more partially-allocated slabs. For example, each address may refer to a location in memory in which the buffer is located. Storing the set of addresses in the new magazine causes the new magazine to be considered a full magazine.

At block 536, a reference to the full magazine is transferred from the slab layer to the depot layer.

At block 540, the reference to the full magazine is transferred from the depot layer to the processor. Once the processor receives the full magazine, the processor may obtain a first reference to a buffer from the magazine to satisfy the request (e.g., from block 504). For example, the processor may receive a request from a thread for a buffer. In response, the processor may retrieve the first reference to a buffer from the magazine, remove the first reference to the buffer from the magazine, and allocate the buffer references by the first reference to the requesting thread. This process may continue until the magazine is empty. When the magazine is empty blocks 508-540 may execute a gain to obtain a full magazine for the processor.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a control flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, control structures, and/or program statements. A code segment may be coupled to another code segment or a hardware circuit by passing and/or receiving information, control, arguments, parameters, and/or memory contents. Information, arguments, parameters, control, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing control, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or control.

While the principles of the disclosure have been described above in connection with specific apparatuses and methods, it is to be clearly understood that this description is made only by way of example and not as limitation on the scope of the disclosure.

The invention claimed is:

1. A method comprising:
 detecting an application workload shift;
 in response to detecting the application workload shift, adjusting a buffer size from a first size to a second size;
 adjusting each magazine of a first plurality of magazines allocated to a processor, wherein each magazine of the first plurality of magazines includes a set of references to a first plurality of buffers for allocation to a plurality of threads executing on the processor;
 requesting, by a thread of the plurality of threads, allocation of a buffer of the first plurality of buffers;
 determining that each magazine of the first plurality of magazines is empty;
 determining that a request for a second plurality of magazines comprising additional sets of references to the first plurality of buffers cannot be satisfied;
 identifying a plurality of partially-allocated slabs, each partially-allocated slab of the plurality of partially-allocated slabs including a second plurality of buffers for allocation to the plurality of threads executing on the processor;
 generating a new magazine; and
 filling the new magazine with a set of references to the second plurality of buffers of each partially-allocated slab of the plurality of partially-allocated slabs.

2. The method of claim 1, further comprising:
 replacing a magazine of the first plurality of magazines with the new magazine.

3. The method of claim 1, wherein allocation of the buffer of the first plurality of buffers causes the processor to remove at least one reference of the set of references to the first plurality of buffers from a magazine of the first plurality of magazines.

4. The method of claim 1, wherein determining that the request for the second plurality of magazines comprising additional sets of references to the first plurality of buffers cannot be satisfied includes:
 determining that the set of references to the first plurality of buffers of each magazine of the first plurality of magazines have been removed.

5. The method of claim 1, wherein identifying the plurality of partially-allocated slabs includes:
 sorting a set of partially-allocated slabs according to an amount of free buffers in each partially-allocated slab of the set of partially-allocated slabs, wherein the plurality of partially-allocated slabs corresponds to partially-allocated slabs of the set of partially-allocated slabs having a fewest amount of free buffers.

6. The method of claim 1, further comprising:
determining that there are insufficient free buffers within the plurality of partially-allocated slabs to fill the new magazine; and
storing in the new magazine, addresses of one or more free buffers from an unallocated slab until the new magazine is full, wherein the unallocated slab does not include memory that has been allocated.

7. The method of claim 1, further comprising:
allocating, by the processor, a buffer from the new magazine to a thread; and
executing, by the processor, the thread.

8. A system comprising:
a processor;
a non-transitory computer-readable medium storing instructions that when executed by the processor, cause the processor to perform operations including:
detecting an application workload shift;
in response to detecting the application workload shift, adjusting a buffer size from a first size to a second size;
adjusting each magazine of a first plurality of magazines allocated to the processor, wherein each magazine of the first plurality of magazines includes a set of references to a first plurality of buffers for allocation to a plurality of threads executing on the processor;
requesting, by a thread of the plurality of threads, allocation of a buffer of the first plurality of buffers;
determining that each magazine of the first plurality of magazines is empty;
determining that a request for a second plurality of magazines comprising additional sets of references to the first plurality of buffers cannot be satisfied;
identifying a plurality of partially-allocated slabs, each partially-allocated slab of the plurality of partially-allocated slabs including a second plurality of buffers for allocation to the plurality of threads executing on the processor;
generating a new magazine; and
filling the new magazine with a set of references to the second plurality of buffers of each partially-allocated slab of the plurality of partially-allocated slabs.

9. The system of claim 8, further comprising:
replacing a magazine of the first plurality of magazines with the new magazine.

10. The system of claim 8, wherein allocation of the buffer of the first plurality of buffers causes the processor to remove at least one reference of the set of references to the first plurality of buffers from a magazine of the first plurality of magazines.

11. The system of claim 8, wherein determining that the request for the second plurality of magazines comprising additional sets of references to the first plurality of buffers cannot be satisfied includes:
determining that the set of references to the first plurality of buffers of each magazine of the first plurality of magazines have been removed.

12. The system of claim 8, wherein identifying the plurality of partially-allocated slabs includes:
sorting a set of partially-allocated slabs according to an amount of free buffers in each partially-allocated slab of the set of partially-allocated slabs, wherein the plurality of partially-allocated slabs correspond to partially-allocated slabs of the set of partially-allocated slabs having a fewest amount of free buffers.

13. The system of claim 8, further comprising:
determining that there are insufficient free buffers within the plurality of partially-allocated slabs to fill the new magazine; and
storing in the new magazine, addresses of one or more free buffers from an unallocated slab until the new magazine is full, wherein the unallocated slab does not include memory that has been allocated.

14. The system of claim 8, further comprising:
allocating, by the processor, a buffer from the new magazine to a thread; and
executing, by the processor, the thread.

15. A non-transitory computer-readable medium storing instructions that when executed by a processor, cause the processor to perform operations including:
detecting an application workload shift;
in response to detecting the application workload shift, adjusting a buffer size from a first size to a second size;
adjusting each magazine of a first plurality of magazines allocated to the processor, wherein each magazine of the first plurality of magazines includes a set of references to a first plurality of buffers for allocation to a plurality of threads executing on the processor;
requesting, by a thread of the plurality of threads, allocation of a buffer of the first plurality of buffers;
determining that each magazine of the first plurality of magazines is empty;
determining that a request for a second plurality of magazines comprising additional sets of references to the first plurality of buffers cannot be satisfied;
identifying a plurality of partially-allocated slabs, each partially-allocated slab of the plurality of partially-allocated slabs including a second plurality of buffers for allocation to the plurality of threads executing on the processor;
generating a new magazine; and
filling the new magazine with a set of references to the second plurality of buffers of each partially-allocated slab of the plurality of partially-allocated slabs.

16. The non-transitory computer-readable medium of claim 15, further comprising:
replacing a magazine of the first plurality of magazines with the new magazine, wherein allocation of the buffer of the first plurality of buffers causes the processor to remove at least one reference of the set of references to the first plurality of buffers from a magazine of the first plurality of magazines.

17. The non-transitory computer-readable medium of claim 15, wherein determining that the request for the second plurality of magazines comprising additional sets of references to the first plurality of buffers cannot be satisfied includes:
determining that the set of references to the first plurality of buffers of each magazine of the first plurality of magazines have been removed.

18. The non-transitory computer-readable medium of claim 15, wherein identifying the plurality of partially-allocated slabs includes:
sorting a set of partially-allocated slabs according to an amount of free buffers in each partially-allocated slab of the set of partially-allocated slabs, wherein the plurality of partially-allocated slabs correspond to partially-allocated slabs of the set of partially-allocated slabs having a fewest amount of free buffers.

19. The non-transitory computer-readable medium of claim 15, further comprising:
- determining that there are insufficient free buffers within the plurality of partially-allocated slabs to fill the new magazine; and
- storing in the new magazine, addresses of one or more free buffers from an unallocated slab until the new magazine is full, wherein the unallocated slab does not include memory that has been allocated.

20. The non-transitory computer-readable medium of claim 15, further comprising:
- allocating, by the processor, a first buffer from the new magazine to a thread;
- removing, from the new magazine, the address of the first buffer from the magazine; and
- executing, by the processor, the thread using the first buffer.

\* \* \* \* \*

UNITED STATES PATENT AND TRADEMARK OFFICE
CERTIFICATE OF CORRECTION

PATENT NO. : 11,630,776 B2  
APPLICATION NO. : 17/827209  
DATED : April 18, 2023  
INVENTOR(S) : Roch Bourbonnais Page 1 of 1

It is certified that error appears in the above-identified patent and that said Letters Patent is hereby corrected as shown below:

In the Specification

In Column 2, Line 42, delete "disclose." and insert -- disclosure. --, therefor.

In Column 6, Line 2, delete "magazine," and insert -- magazine), --, therefor.

In Column 6, Line 58, after "according" insert -- to --, therefor.

In Column 13, Line 22, after "according" insert -- to --, therefor.

In Column 13, Line 57, delete "disclose." and insert -- disclosure. --, therefor.

In Column 14, Line 40, after "or" insert -- more --, therefor.

Signed and Sealed this  
Thirteenth Day of February, 2024

Katherine Kelly Vidal  
*Director of the United States Patent and Trademark Office*